(12) United States Patent
Lee

(10) Patent No.: US 10,657,615 B2
(45) Date of Patent: May 19, 2020

(54) SYSTEM AND METHOD OF ALLOCATING COMPUTING RESOURCES BASED ON JURISDICTION

(71) Applicant: Bank of America Corporation, Charlotte, NC (US)

(72) Inventor: Jisoo Lee, Chesterfield, NJ (US)

(73) Assignee: Bank of America Corporation, Charlotte, NC (US)

( * ) Notice: Subject to any disclaimer, the term of this patent is extended or adjusted under 35 U.S.C. 154(b) by 256 days.

(21) Appl. No.: 15/618,925

(22) Filed: Jun. 9, 2017

(65) Prior Publication Data

US 2018/0357735 A1    Dec. 13, 2018

(51) Int. Cl.
*G06Q 40/02* (2012.01)
*G06Q 50/26* (2012.01)
*G06Q 30/00* (2012.01)
*G06F 21/62* (2013.01)
*G06Q 30/06* (2012.01)

(52) U.S. Cl.
CPC ....... *G06Q 50/265* (2013.01); *G06F 21/6245* (2013.01); *G06Q 30/018* (2013.01); *G06Q 30/06* (2013.01); *G06Q 40/02* (2013.01)

(58) Field of Classification Search
CPC .................................................... H04L 63/20
See application file for complete search history.

(56) References Cited

U.S. PATENT DOCUMENTS

| | | | |
|---|---|---|---|
| 8,285,681 B2 | 10/2012 | Prahlad et al. | |
| 8,527,549 B2 | 9/2013 | Cidon | |
| 8,751,627 B2 | 6/2014 | Lin et al. | |
| 8,762,642 B2 | 6/2014 | Bates et al. | |
| 8,788,628 B1 | 7/2014 | Taylor et al. | |
| 8,805,951 B1 | 8/2014 | Faibish et al. | |
| 8,805,968 B2 | 8/2014 | Taylor et al. | |
| 8,832,820 B2 | 9/2014 | Barjatiya et al. | |
| 8,850,130 B1 | 9/2014 | Aron et al. | |
| 8,893,279 B1 | 11/2014 | Chandrasekhar et al. | |
| 9,059,910 B1 | 6/2015 | Liu et al. | |
| 9,066,133 B2 | 6/2015 | Sharif-Ahmadi et al. | |
| 9,147,195 B2 | 9/2015 | Sivaramakrishnan et al. | |
| 9,256,374 B1 | 2/2016 | Aron et al. | |
| 9,398,087 B1 | 7/2016 | Hosie et al. | |

(Continued)

*Primary Examiner* — Yves Dalencourt
*Assistant Examiner* — Sm Z Islam
(74) *Attorney, Agent, or Firm* — Michael A. Springs

(57) ABSTRACT

In one or more embodiments, one or more processes, methods, and/or systems associated with a first jurisdiction may receive a request for a transaction, that involves private information, from a second computer system in a second jurisdiction. For example, the second jurisdiction may be subject to one or more privacy statutes and/or one or more privacy regulations. For instance, the one or more privacy statutes and/or one or more privacy regulations may apply to entities outside the jurisdiction that collect and/or process data of a resident and/or a citizen of the jurisdiction. In one or more embodiments, the one or more processes, methods, and/or systems may further determine that the second computer system is in the second jurisdiction, provide an instruction to a third computer system, in the second jurisdiction, to execute program instructions that executes the transaction, and receive, from the third computer system, metadata associated with the transaction.

20 Claims, 10 Drawing Sheets

(56) References Cited

U.S. PATENT DOCUMENTS

| | | |
|---|---|---|
| 9,424,437 B1 | 8/2016 | Ancin et al. |
| 9,454,398 B2 | 9/2016 | Hacker |
| 9,565,200 B2 | 2/2017 | Bacastow et al. |
| 2006/0235776 A1* | 10/2006 | Temme ................. G06Q 40/00 705/31 |
| 2010/0070362 A1* | 3/2010 | Bice .................... G06Q 20/387 705/14.26 |
| 2010/0299405 A1* | 11/2010 | Socher .................. G06Q 10/00 709/219 |
| 2014/0026133 A1* | 1/2014 | Parker .................. G06F 9/5083 718/1 |
| 2015/0262136 A1* | 9/2015 | Clementi ............. G06Q 20/042 705/45 |
| 2016/0269308 A1 | 9/2016 | Lee et al. |
| 2017/0039218 A1 | 2/2017 | Prahlad et al. |
| 2017/0262854 A1* | 9/2017 | Donovan ......... G06Q 20/40145 |

* cited by examiner

SYSTEM AND METHOD OF ALLOCATING COMPUTING RESOURCES BASED ON JURISDICTION

TECHNICAL FIELD

Certain embodiments of this disclosure relate generally to distributed computer systems and more particularly to allocating computing resources based on jurisdiction.

BACKGROUND

Networks allow users to access various types of computing resources, which may include hardware resources and/or software resources. Examples of hardware resources include computer networks, servers, memory, and so on. Examples of software resources include applications, services, data, and so on. In distributed computing systems, such as cloud-based systems, a user may be allocated computing resources on a temporary basis. For example, the user may be allocated computing resources in order to complete a transaction. Certain transactions may require the communication of private information. The computing resources may be configured to provide encryption and/or other security measures to help protect the privacy of such information. In some cases, one or more privacy statutes and/or privacy regulations may require that the computing resources comply with certain security measures.

SUMMARY

In one or more embodiments, one or more processes, methods, and/or systems associated with a first jurisdiction may receive a request for a transaction, that involves private information, from a second computer system in a second jurisdiction. For example, the second jurisdiction may be subject to one or more privacy statutes and/or one or more privacy regulations. For instance, the one or more privacy statutes and/or one or more privacy regulations may apply to entities outside the jurisdiction that collect and/or process data of a resident and/or a citizen of the jurisdiction. In one or more embodiments, the one or more processes, methods, and/or systems may determine that the second computer system is in the second jurisdiction, may provide an instruction to a third computer system, in the second jurisdiction, to execute program instructions that executes the transaction, and may receive, from the third computer system, metadata associated with the transaction. In one example, at least one of a container and a virtual machine may include the program instructions to execute the transaction. In another example, the metadata may include at least one of a transaction identification, a receipt, and time information. In one instance, the transaction may include a commercial transaction. In another instance, the transaction may include a banking transaction.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
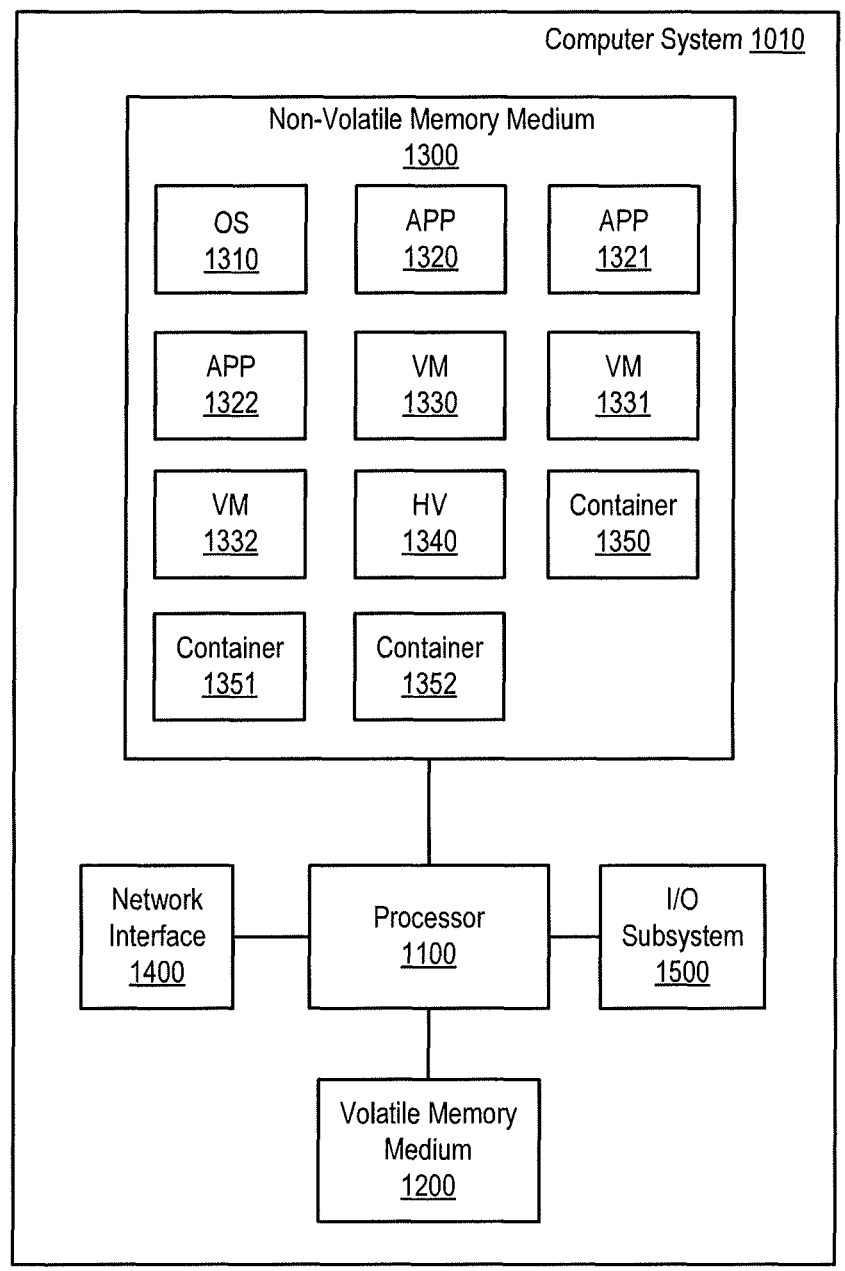
FIG. 1 illustrates an example of a computer system, according to one or more embodiments.

In the following description, details are set forth by way of example to facilitate discussion of the disclosed subject matter. It should be apparent to a person of ordinary skill in the field, however, that the disclosed embodiments are for purposes of example and are not exhaustive of all possible embodiments.

As used herein, a reference numeral followed by a letter refers to a specific instance of an element and the numeral only form of the reference numeral refers to the collective element. Thus, for example, device '12A' refers to an instance of a device class, which may be referred to collectively as devices '12' and any one of which may be referred to generically as a device '12'.

In distributed computing systems, such as cloud-based systems, computing resources can be geographically distributed. Accordingly, it may be possible to allocate resources associated with one geographical location to a user in another geographical location. In certain situations, these geographical locations may be distributed across multiple jurisdictions. Examples of jurisdictions include one or more states, countries, or other types of jurisdictions (e.g., European Union). A jurisdiction can be subject to one or more privacy statutes and/or one or more privacy regulations, and the one or more privacy statutes and/or one or more privacy regulations can apply to entities outside the jurisdiction that collect and/or process data of a resident and/or a citizen of the jurisdiction. Even though the entities are outside the jurisdiction, the entities may conduct business in the jurisdiction, and the one or more privacy statutes and/or the one or more privacy regulations can include a requirement that private information, of a resident and/or a citizen of the jurisdiction, is not transferred outside the jurisdiction. Private information can include personal data, and the personal data may include information relating to an individual, such as financial information, health information, personally identifiable information (e.g., social security number), etc. Certain embodiments of the present disclosure may provide solutions for allocating computing resources of a geographically distributed computing system in a manner that allows for compliance with privacy statutes and privacy regulations of the applicable jurisdiction.

In one or more embodiments, one or more privacy statutes and/or one or more privacy regulations may include a requirement that a transaction that involves a citizen of the jurisdiction occurs within the jurisdiction. In one example, the transaction may include a commercial transaction. In another example, the transaction may include a banking transaction. In one or more embodiments, private information may include personal data, and the personal data may include information relating to an individual. For example, the information relating to the individual may include information related to a private life, a professional life, and/or a public life of the individual. For instance, the information relating to the individual may include one or more of a home address, a photo, an email address, a name, a banking detail, medical information, a post on a social network, and an Internet protocol (IP) address of a computer system, among others.

In one or more embodiments, a first computer system within a jurisdiction may be permitted to provide private information to a second computer system within the jurisdiction, and the second computer system may provide the private information and/or metadata associated with the private information to a third computer system outside the jurisdiction. For example, one or more statutes and/or one or more regulations may permit the first computer system within the jurisdiction providing, via a network within the jurisdiction, the private information to the second computer system within the jurisdiction. In one or more embodiments, the second computer system may provide metadata, associated with utilizing and/or processing the private information, to a third computer system outside the jurisdiction. For example, a transaction may utilize and/or process the private information. For instance, the transaction may include one or more of a banking transaction, a sales transaction, a financial transaction, a stock transaction, a property transaction, and a commercial transaction, among others, and metadata associated with the transaction may be provided to the third computer system outside the jurisdiction.

In one or more embodiments, the third computer system outside the jurisdiction may receive, via a network, a request for a transaction from the first computer system. For example, the third computer system may provide, via the network, an instruction to the second computer system, within the jurisdiction, to execute program instructions that executes the transaction. For example, the first computer system and the second computer system may execute the transaction, and the second computer system may provide metadata associated with the transaction to the third computer system. In one or more embodiments, the third computer system may provide a branded look and feel to the second computer system. For example, an entity that owns and/or controls the third computer system may provide may provide a branded look and feel of the entity to the second computer system. In one or more embodiments, the program instructions that executes the transaction may include the branded look and feel of the entity. For example, the program instructions, that executes the transaction, may provide the branded look and feel of the entity to a user of the first computer system.

In one or more embodiments, computing resources, such as computer systems or portions thereof, may be utilized to perform various computer-oriented operations, such as performing computations, processing information, classifying data, routing data, detecting a threshold, receiving data, recording data, providing data, producing data, and reproducing data, among others. The computing resources may be utilized during one or more periods of time and idle during other periods of time. During the idle periods, the computing resources can be shut down or left powered with no computer-oriented operations to perform, which may result in the computing resources being non-utilized or under utilized. Embodiments of the present disclosure may allow computing resources that might otherwise be non-utilized or under utilized to be made available to one or more entities for compensation.

In one or more embodiments, computing resources may be made available to one or more entities. In one example, an entity may be or include one or more of a person, multiple people, a corporation, multiple corporations, a government, multiple governments, a department of a government, and multiple departments of a government, among others. In one or more embodiments, the computing resources may be made available to one or more entities for compensation. For example, by making the computing resources available to one or more entities for compensation, micro clouds may be implemented that provide shared computer processing resources that might otherwise be non-utilized or under utilized. In one instance, a micro cloud may refer to computing resources that may be utilized, as a secondary purpose, for compensation by other entities. In another instance, users of the micro clouds may not be limited to the specific applications offered via grid computing solutions and may utilize specific applications and/or architectures of choice.

In one or more embodiments, an entity may offer computing resources for compensation via a forum. In one instance, a corporation may offer, via the forum, computing resources that would otherwise be idle or shutdown when not utilized for performing computer-oriented operations. In another instance, a person or a family may offer, via the forum, computing resources that would otherwise be idle or shutdown at night or during another time period (e.g., while the person or one or more family members are at a place of employment).

In one or more embodiments, a forum may include and/or provide computing resources that are offered compensation and/or computing resources that are offered for trade. For example, two or more entities may exchange computing resources via a form that allows computing resources to be offered for trade. In one or more embodiments, the forum may be compensated for the exchange of computing resources. As examples, the forum may be compensated by one or more of the entities on a subscription basis, on a flat fee basis (e.g., per allocation or per period of use of a computing resource or type of computing resource), as a percentage of the amount of compensation paid by the user of the computing resource to the owner of the computing resource, or other suitable compensation.

In one or more embodiments, metadata that includes computing resources that are offered, for compensation and/or for trade, may be stored and provided via the forum. For example, the metadata may include one or more of a number of computer systems, one or more rates of processing instructions, one or more operating system identifications, one or more versions corresponding to the one or more operating system identifications, one or more sizes of volatile storages, one or more sizes of non-volatile storages, one or more data communication rates, one or more data communication latencies, one or more data communication throughputs, one or more geographical locations, one or more network locations, and/or one or more cache sizes, among others.

In one or more embodiments, an entity may utilize a computing resource. For example, the entity may execute program instructions via the computing resource. In one or more embodiments, the program instructions may be packaged and/or encapsulated via one or more containers. For example, a container may be or include software in a file system that includes one or more of instructions executable by a processor (e.g., a program, software, an application, server software, a service, etc.), one or more runtime libraries, one or more system tools, and one or more system libraries, among others. For instance, a container may be or include a Docker container, a Linux container (LXC), or a Kubernetes pod, among others. In one or more embodiments, a container may provide and/or implement operating system-level virtualization via a virtual environment that includes a separate process and network space, rather than creating and/or implementing a virtual machine. In one or more embodiments, OpenShift may be utilized. For example, OpenShift may include a version of Kubernetes that is supported by Red Hat, Inc. In one or more embodiments, containers may be more conducive to micro services. For example, micro services may be more conducive to micro clouds.

In one or more embodiments, Kubernetes may be utilized in providing one or more containers to one or more computer systems. In one example, Kubernetes may include a system that may automate deployment of one or more containers to one or more computer systems. In another example, Kubernetes may provide and/or permit scaling and/or management of containerized applications. For instance, Kubernetes may provide and/or permit scaling and/or management one or more of containers with one or more computer systems.

Turning now to FIG. 1, an example of a computer system is illustrated, according to one or more embodiments. As shown, a computer system 1010 may include a processor 1100, a volatile memory medium 1200, a non-volatile memory medium 1300, a network interface 1400, and an input/output (I/O) subsystem 1500. As illustrated, volatile memory medium 1200, non-volatile memory medium 1300, network interface 1400, and I/O subsystem 1500 may be communicatively coupled to processor 1100.

As shown, non-volatile memory medium 1300 may include an operating system (OS) 1310, applications (APPs) 1320-1322, virtual machines (VMs) 1330-1332, a hypervisor (HV) 1340, and containers 1350-1352. In one or more embodiments, one or more of OS 1310, APPs 1320-1322, VMs 1330-1332, HV 1340, and containers 1350-1352 may include instructions executable by processor 1100. In one example, processor 1100 may execute instructions of one or more of OS 1310, APPs 1320-1322, VMs 1330-1332, HV 1340, and containers 1350-1352 via non-volatile memory medium 1300. In another example, one or more portions of the instructions of the one or more of OS 1310, APPs 1320-1332, VMs 1330-1332, HV 1340, and containers 1350-1352 may be transferred to volatile memory medium 1200, and processor 1100 may execute the one or more portions of the instructions of the one or more of OS 1310, APPs 1320-1322, VMs 1330-1332, HV 1340, and containers 1350-1352 via volatile memory medium 1200.

In one or more embodiments, HV 1340 may include one or more of software, firmware, and hardware that creates and executes one or more VMs (e.g., one or more of VMs 1330-1332). For example, computer system 1010 may be considered host machine when HV 1340 executes and one or more of VMs 1330-1332 are executed via HV 1340. For instance, a virtual machine (VM) (e.g., a VM of VMs 1330-1332) may be considered a guest machine. In one or more embodiments, a VM may provide one or more structures and/or functionalities as those described with reference to computer system 1010 (e.g., singularly or via nesting of hypervisors and virtual machines). In one example, the VM may provide emulated devices to a guest OS that executes via the VM. In another example, the VM may provide hardware devices to the guest OS that executes via the VM. In one instance, the guest OS may access hardware in a pass-through configuration. In another instance, the guest OS may access hardware in a single root input/output virtualization (SR-IOV) configuration. In one or more embodiments, guest operating systems may share one or more devices of a host machine. For example, the guest operating systems may share one or more of a network adapter via virtual network adapters and a storage device via a virtual storage devices (e.g., virtual disks, virtual memory, etc.), among others.

In one or more embodiments, OS level virtualization may be utilized. For example, OS level virtualization may include a kernel of an OS that permits multiple isolated user space instances of collections of processes (e.g., programs, applications, services, etc.). For instance, these instances are often referred to as "containers", "software containers", "virtualization engines", or "jails" (e.g., FreeBSD jails, chroot jails, etc.). In one or more embodiments, with OS level virtualization, an OS may behave and/or may appear like multiple different, individual computer systems. For example, little to no overhead may be imposed by OS level virtualization, as processes in OS level virtual partitions may utilize a single system call interface of an OS. For instance, OS level virtual partitions may not be subjected to emulation or be executed via virtual machines. In one or more embodiments, OS level virtualization may be utilized in consolidating computer system hardware or virtual machines by moving services on separate hosts or virtual machines into containers on a computer system or single virtual machine.

In one or more embodiments, a container may be or include software in a file system that includes one or more of instructions executable by a processor (e.g., a program, software, an application, server software, a service, etc.), one or more runtime libraries, one or more system tools, and one or more system libraries, among others. For example, a container may be or include a Docker container, a LXC, or a Kubernetes pod, among others. In one or more embodiments, a container may provide and/or may implement operating system-level virtualization via a virtual environment that includes a separate process space and/or a separate network space, rather than creating and/or implementing a virtual machine.

In one or more embodiments, a container may be or include a pod (e.g., a Kubernetes pod). For example, a pod may provide and/or add a higher level of abstraction to one or more containerized elements. For instance, a pod may include one or more containers that may be warranted to be co-located and/or executed on a computer system (e.g., a host computer system, host machine, etc.) and may share resources of the computer system. In one or more embodiments, a thick container may be or include a pod, and a thin container may include a single container.

In one or more embodiments, containers may provide and/or offer an immutable quality and/or option. For example, a container may be deployed, destroyed, modified, re-constructed and/or re-created, and re-deployed. In one instance, instructions, executable by a processor, of a container may not be modified while the container is executing.

In another instance, instructions, executable by a processor, of a container may not be modified once the container is created.

In one or more embodiments, the term "memory medium" may mean a "memory device", a "memory", a "storage device", a "tangible computer readable storage medium", and/or a "computer-readable medium". In one example, a memory medium may be a volatile memory medium. For instance, the volatile memory medium may lose stored data when the volatile memory medium no longer receives power. In a second example, a memory medium may be a non-volatile memory medium. For instance, the non-volatile memory medium may not lose stored data when the volatile memory medium no longer receives power or when power is not applied. In another example, a memory medium may include a volatile memory medium and a non-volatile memory medium.

In one or more embodiments, a volatile memory medium may include volatile storage. For example, the volatile storage may include random access memory (RAM), dynamic RAM (DRAM), static RAM (SRAM), and/or extended data out RAM (EDO RAM), among others. In one or more embodiments, a non-volatile memory may include non-volatile storage. For example, the non-volatile storage may include read only memory (ROM), programmable ROM (PROM), erasable PROM (EPROM), electrically erasable PROM (EEPROM), a magnetic storage medium (e.g., a hard drive, a floppy disk, a magnetic tape, etc.), ferroelectric RAM (FRAM), flash memory, a solid state drive (SSD), non-volatile RAM (NVRAM), a one-time programmable (OTP) memory, and/or optical storage (e.g., a compact disc (CD), a digital versatile disc (DVD), a BLU-RAY disc (BD), etc.), among others.

In one or more embodiments, I/O subsystem 1500 may include or represent a variety of communication interfaces, graphics interfaces, video interfaces, user input interfaces, and/or peripheral interfaces, among others. For example, I/O subsystem 1500 may include one or more of a touch screen, a display, a display adapter, and a universal serial bus (USB) interface, among others. For instance, a touch screen may include circuitry that enables touch functionality in conjunction with a display that is driven by a display adapter.

In one or more embodiments, network interface 1400 may be configured to be coupled to a network. For example, network interface 1400 may permit computer system 1010 to be communicatively coupled to a network. In one instance, network interface 1400 may be configured to be coupled to a wired network. In a second instance, network interface 1400 may be configured to be coupled to a wireless network. In a second instance, network interface 1400 may be configured to be coupled to an optical network.

In one or more embodiments, one or more of volatile memory medium 1200, non-volatile memory medium 1300, network interface 1400, and I/O subsystem 1500 may be communicatively coupled to processor 1100 via one or more buses. For example, a bus may include one or more of a peripheral component interconnect (PCI) bus, a serial peripheral interface (SPI) bus, an inter-integrated circuit (I²C) bus, an enhanced serial peripheral interface (eSPI) bus, a system management bus (SMBus), a universal serial bus, and a low pin count (LPC) bus, among others. In one or more embodiments, one or more of volatile memory medium 1200, non-volatile memory medium 1300, network interface 1400, and I/O subsystem 1500 may be communicatively coupled to processor 1100 via one or more of a PCI-Express (PCIe) root complex and one or more PCIe switches, among others.

In one or more embodiments, processor 1100 may execute instructions in implementing one or more systems, flowcharts, methods, and/or processes described herein. In one example, processor 1100 may execute processor instructions from one or more of memory media 1200 and 1300 in implementing one or more systems, flowcharts, methods, and/or processes described herein. In another example, processor 1100 may execute instructions received via network interface 1400 in implementing one or more systems, flowcharts, methods, and/or processes described herein.

In one or more embodiments, processor 1100 may include circuitry that may interpret and/or execute program instructions and/or process data, among others. For example, processor 1100 may include one or more of a system, a device, and an apparatus that may interpret and/or execute program instructions and/or process data, among others. For instance, processor 1100 may include one or more of a central processing unit (CPU), a microprocessor, a graphics processing unit (GPU), an application processor, a digital signal processor (DSP), and an application specific integrated circuit (ASIC), among others.

Figure 2:
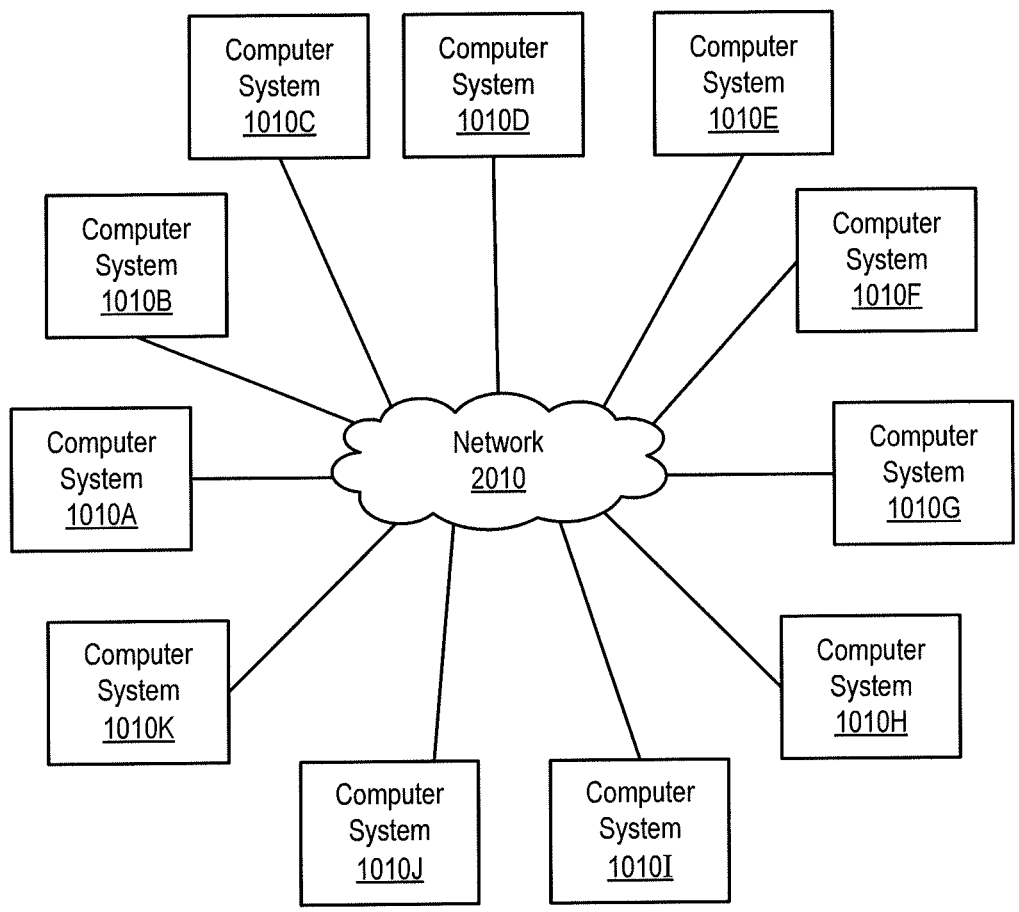
FIG. 2 illustrates an example of computer systems coupled to a network, according to one or more embodiments.

Turning now to FIG. 2, computer systems coupled to a network are illustrated, according to one or more embodiments. As shown, computer systems 1010A-1010K may be communicatively coupled to a network 2010. In one or more embodiments, network 2010 may include one or more of a wired network, an optical network, and a wireless network. For example, network 2010 may include one or more of a local area network (LAN), a wide area network (WAN), a wireless LAN (WLAN), a metropolitan area network (MAN), a public switched telephone network (PSTN), a public WAN (e.g., an Internet), a private WAN, a cellular telephone network, a satellite telephone network, and a virtual private network (VPN), among others. In one or more embodiments, network 2010 may be coupled to one or more other networks. For example, network 2010 may be coupled to one or more of a LAN, a WAN, a WLAN, a MAN, a PSTN, a public WAN, a private WAN, a cellular telephone network, a satellite telephone network, and a VPN, among others.

Figure 3:
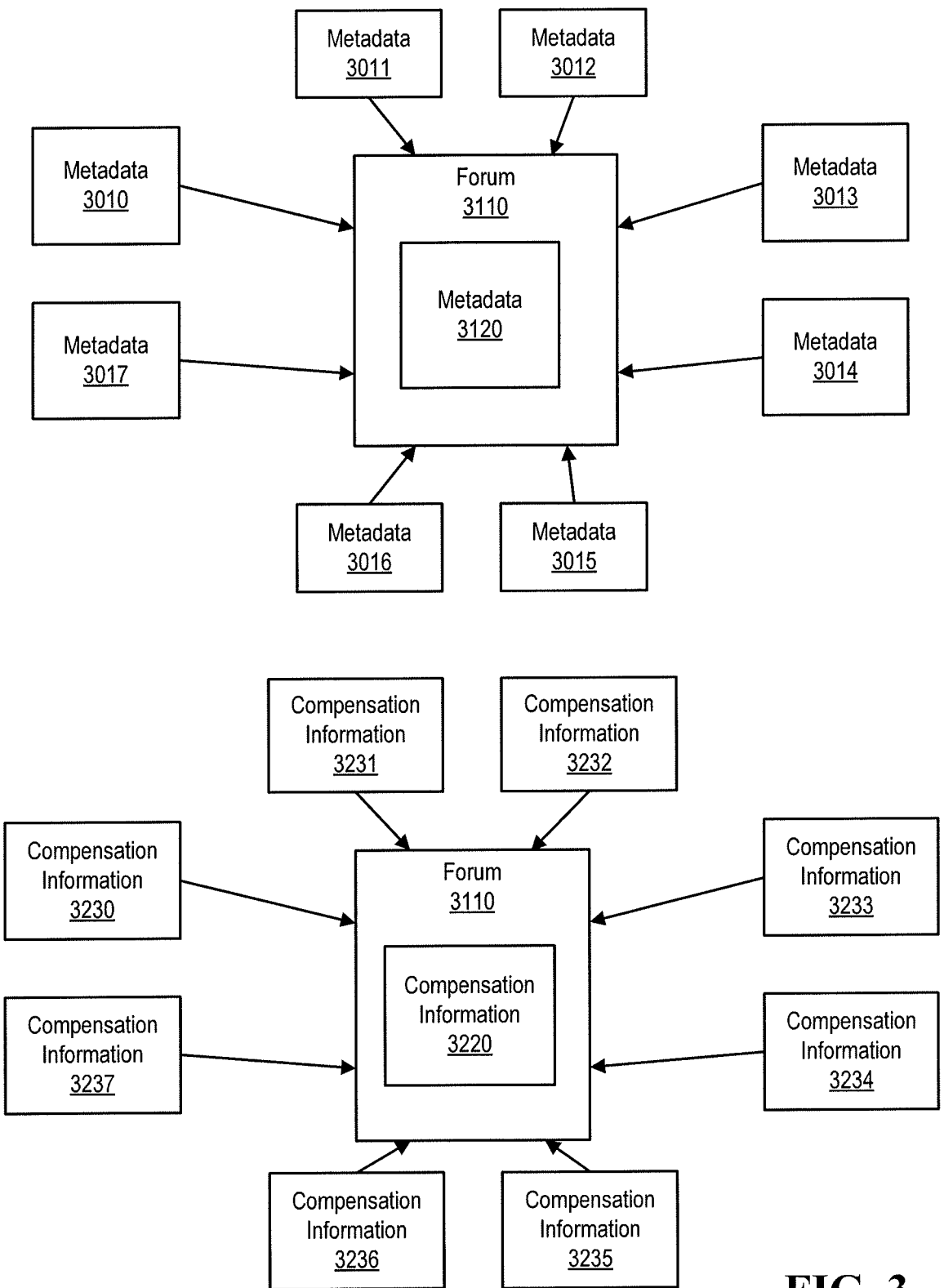
FIG. 3 illustrates an example of a forum that receives metadata and compensation information, according to one or more embodiments.

Turning now to FIG. 3, a forum that receives metadata and compensation information is illustrated, according to one or more embodiments. As shown, a forum 3110 may receive metadata 3010-3017. In one or more embodiments, one or more of metadata 3010-3017 may include one or more of a number of computer systems, one or more rates of processing instructions, one or more operating system identifications, one or more versions corresponding to the one or more operating system identifications, one or more sizes of volatile storages, one or more sizes of non-volatile storages, one or more data communication rates, one or more data communication latencies, one or more data communication throughputs, one or more geographical locations, one or more network locations, and/or one or more cache sizes, among others. In one or more embodiments, forum 3110 may store metadata 3010-3017 via metadata 3120. For example, metadata 3010-3017 may be stored via a database.

In one or more embodiments, one or more of metadata 3010-3017 may be received from one or more entities that offer one or more computing resources for compensation and/or for trade. For example, the one or more entities that offer the one or more computing resources for compensation and/or for trade may provide, to forum 3110, a number of computer systems, one or more rates of processing instructions, one or more operating system identifications, one or more versions corresponding to the one or more operating system identifications, one or more sizes of volatile storages, one or more sizes of non-volatile storages, one or more data communication rates, one or more data communication latencies, one or more data communication throughputs, one or more geographical locations, one or more network locations, and/or one or more cache sizes, among others.

In one or more embodiments, one or more of metadata 3010-3017 may be received from one or more network providers that provide network services to computing resources of one or more entities that offer one or more computing resources for compensation and/or for trade. For example, the one or more network providers may provide one or more data communication rates, one or more data communication latencies, one or more data communication throughputs, one or more geographical locations, and/or one or more network locations, among others. For instance, a network location may include where, on a network topology, a computing resource is available.

As illustrated, forum 3110 may receive compensation information 3230-3237. In one or more embodiments, one or more of compensation information 3230-3237 may include compensation desires and/or requirements for utilization of one or more computing resources that are offered. In one example, one or more of compensation information 3230-3237 may include one or more minimum compensations for respective one or more computing resources. For instance, a computing resource may include a single computer system or multiple computer systems. In another example, one or more of compensation information 3230-3237 may include one or more trading information. For instance, the trading information may include information associated with one or more of a service, a time period, and a physical object, among others, for utilization of a single computer system or multiple computer systems.

In one or more embodiments, multiple entities may trade computing resources. For example, computing resources of two entities may be located across a planet (e.g., Earth). For instance, computing resources of a first entity of the two entities may be traded during a nighttime period to a second entity of the two entities to utilize during a daytime period of the second entity and vice versa.

In one or more embodiments, forum 3110 may store compensation information 3230-3237 via compensation information 3220. For example, compensation information 3230-3237 may be stored via a database. In one or more embodiments, forum 3110 may include a computer system that includes one or more structures and/or functionalities as those described with reference to computer system 1010. In one or more embodiments, forum 3110 may include multiple computer systems. For example, forum 3110 may include two or more of computer systems 1010A-1010H, among others.

Figure 4:
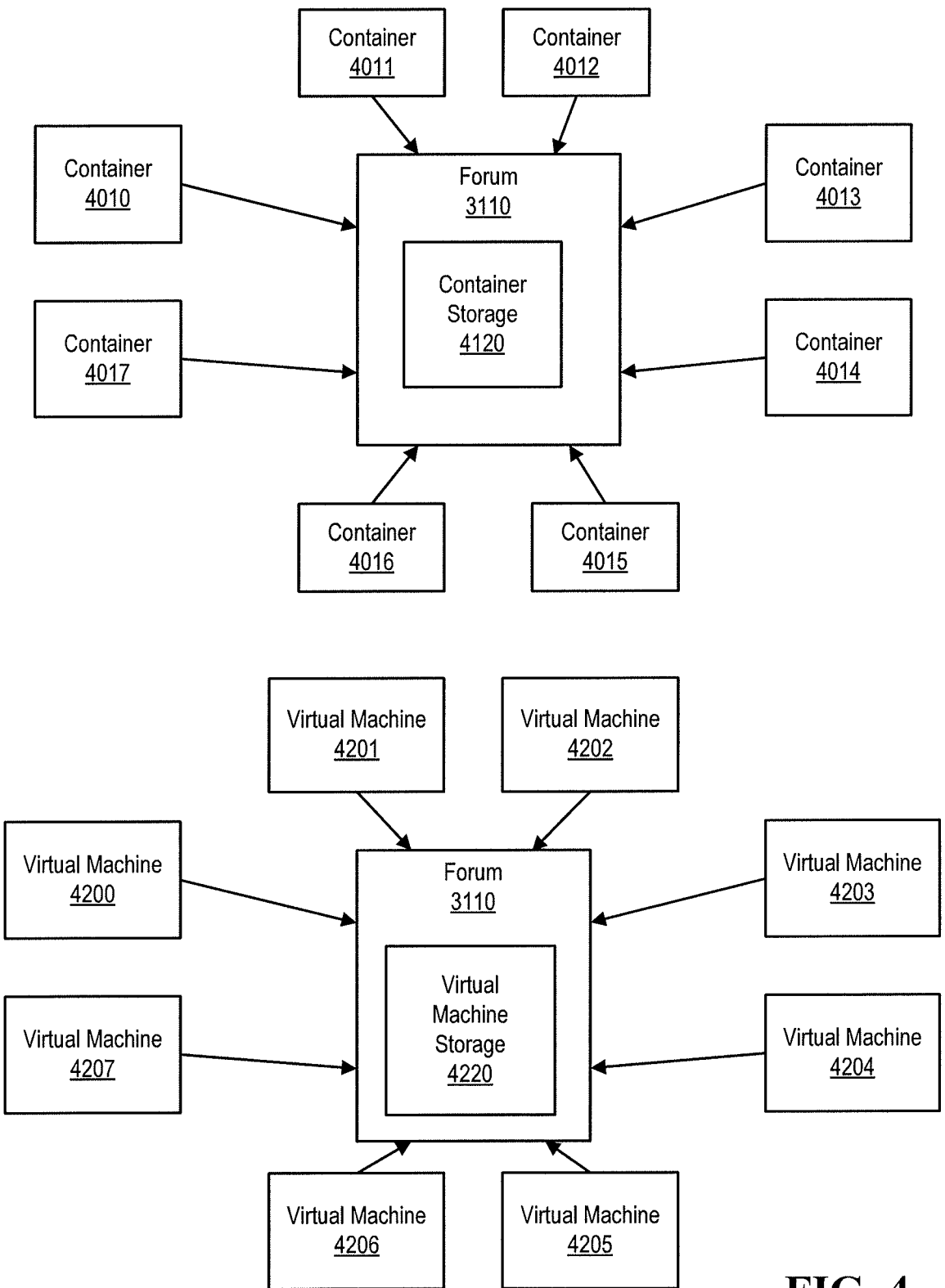
FIG. 4 illustrates an example of a forum that receives containers and virtual machines, according to one or more embodiments.

Turning now to FIG. 4, a forum that receives containers and virtual machines is illustrated, according to one or more embodiments. As shown, forum 3110 may receive containers 4010-4017. As illustrated, forum 3110 may receive virtual machines 4020-4027. In one or more embodiments, an entity may execute program instructions via a computing resource and may package and/or encapsulate the program instructions via one or more containers and/or via one or more virtual machines. In one example, one or more entities may provide, to forum 3110, one or more of containers 4010-4017 to be executed via computing resources that are offered for compensation and/or for trade. For instance, the one or more entities may provide, to forum 3110, one or more of containers 4010-4017 via network 2010. In one or more embodiments, forum 3110 may store containers 4010-4017 via a container storage 4120. In another example, one or more entities may provide, to forum 3110, one or more of virtual machines 4020-4027 to be executed via computing resources that are offered for compensation and/or for trade. For instance, the one or more entities may provide, to forum 3110, one or more of virtual machines 4020-4027 via network 2010. In one or more embodiments, forum 3110 may store virtual machines 4020-4027 via a virtual machine storage 4220.

Figure 5:
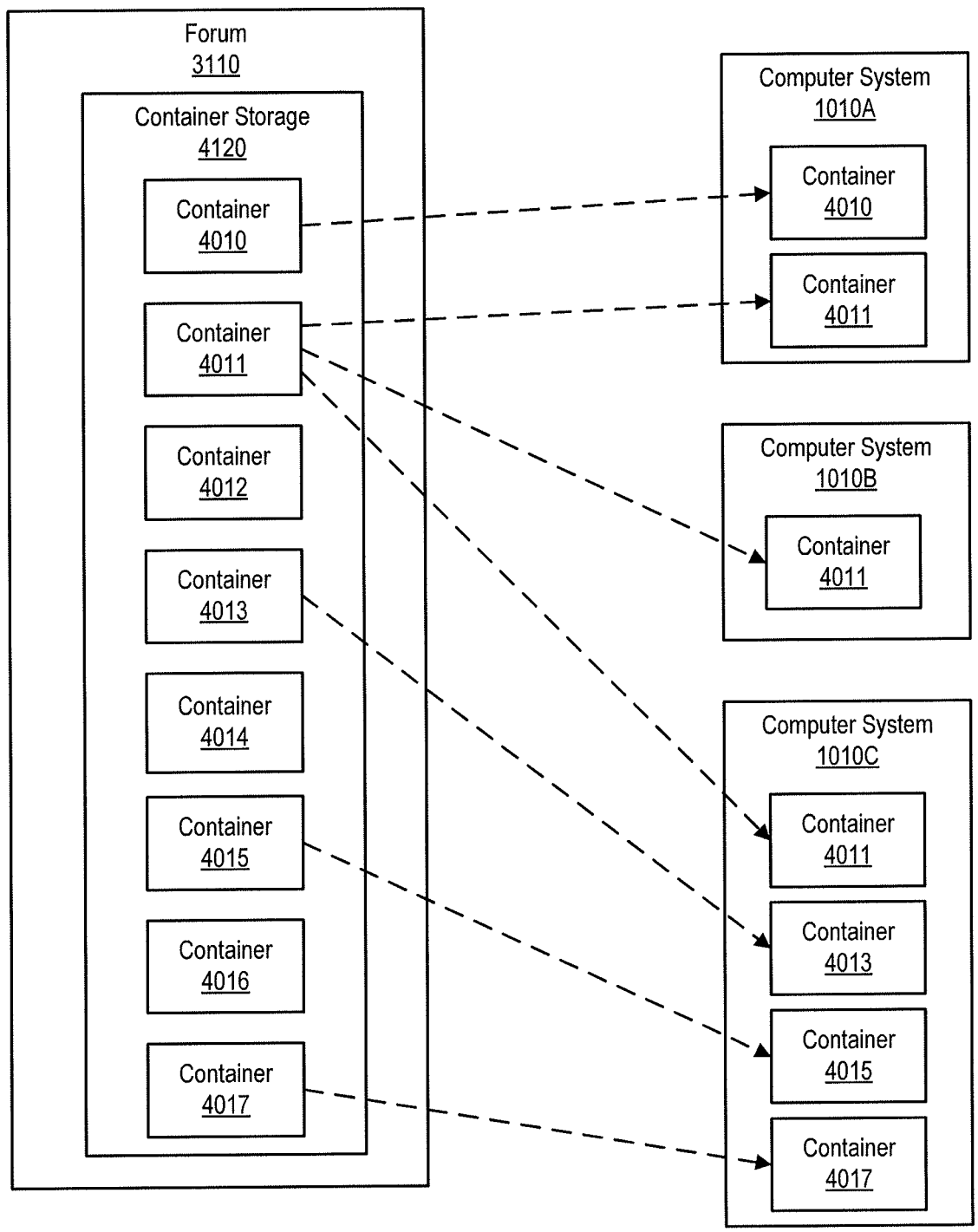
FIG. 5 provides a block diagram illustrating an example of distributing containers to computer systems, according to one or more embodiments.

Turning now to FIG. 5, a block diagram of distributing containers to computer systems is illustrated, according to one or more embodiments. As shown, forum 3110 may provide containers 4010 and 4011 to computer system 1010A. In one or more embodiments, forum 3110 may provide containers 4010 and 4011 to computer system 1010A via network. For example, the network may be or include network 2010. As illustrated, forum 3110 may provide container 4011 to computer system 1010B. In one or more embodiments, forum 3110 may provide container 4011 to computer system 1010B via a network. For example, the network may be or include network 2010. As shown, forum 3110 may provide containers 4011, 4013, 4015, and 4017 to computer system 1010C. In one or more embodiments, forum 3110 may provide containers 4011, 4013, 4015, and 4017 to computer system 1010C via a network. For example, the network may be or include network 2010.

In one or more embodiments, Kubernetes may be utilized in providing one or more of containers 4010-4017 to one or more of computer systems 1010A-1010H. In one example, Kubernetes may include a system that may automate deployment of one or more of containers 4010-4017 to one or more of computer systems 1010A-1010H. In another example, Kubernetes may provide and/or permit scaling and/or management of containerized applications. For instance, Kubernetes may provide and/or permit scaling and/or management of one or more of containers 4010-4017 with one or more of computer systems 1010A-1010H.

In one or more embodiments, one or more of computer systems 1010A-1010C, among others, may be included in one or more computing resources that are offered for compensation and/or trade. For example, one or more entities may own and/or control one or more of computer systems 1010A-1010C, among others. In one instance, a first entity may permit computer system 1010A to receive and execute containers 4010 and 4011 and may permit computer system 1010B to receive and execute container 4011. In a second instance, a second entity, different from the first entity, may permit computer system 1010C to receive and execute containers 4011, 4013, 4015, and 4017. In a third instance, the first entity may permit computer system 1010C to receive and execute containers 4011, 4013, 4015, and 4017. In a fourth instance, a third entity, different from the first entity and the second entity, may be associated with container 4010, and the third entity may execute container 4010 via computer system 1010A. In another instance, a fourth entity, different from the first entity, the second entity, and the third entity, may be associated with container 4011, and the fourth entity may execute container 4011 via computer systems 1010A-1010C. In one or more embodiments, one or more of computer systems 1010A-1010C, among others, may receive one or more of containers 4010-4017, among others, via network 2010.

Figure 6:
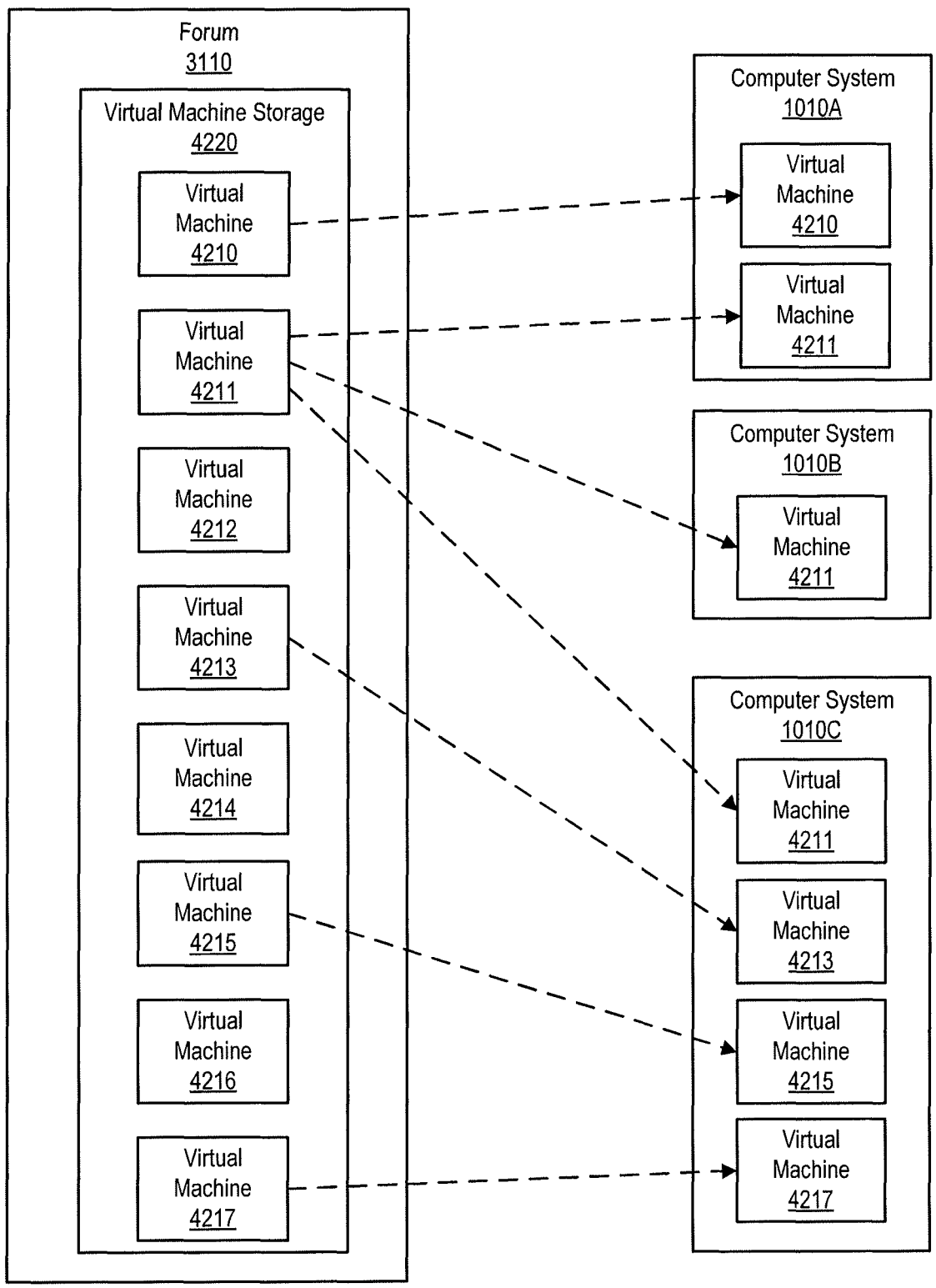
FIG. 6 provides a block diagram illustrating an example of distributing virtual machines to computer systems, according to one or more embodiments.

Turning now to FIG. 6, a block diagram of distributing virtual machines to computer systems is illustrated, according to one or more embodiments. As shown, forum 3110 may provide virtual machines 4210 and 4211 to computer system 1010A. In one or more embodiments, forum 3110 may provide virtual machines 4210 and 4211 to computer system 1010A via network. For example, the network may be or include network 2010. As illustrated, forum 3110 may provide virtual machine 4211 to computer system 1010B. In one or more embodiments, forum 3110 may provide virtual machine 4211 to computer system 1010B via a network. For example, the network may be or include network 2010. As shown, forum 3110 may provide virtual machines 4211, 4213, 4215, and 4217 to computer system 1010C. In one or more embodiments, forum 3110 may provide virtual machines 4211, 4213, 4215, and 4217 to computer system 1010C via a network. For example, the network may be or include network 2010.

In one or more embodiments, one or more of computer systems 1010A-1010C, among others, may be included in one or more computing resources that are offered for compensation and/or trade. For example, one or more entities may own and/or control one or more of computer systems 1010A-1010C, among others. In one instance, a first entity may permit computer system 1010A to receive and execute virtual machines 4210 and 4211 and may permit computer system 1010B to receive and execute virtual machine 4211. In a second instance, a second entity, different from the first entity, may permit computer system 1010C to receive and execute virtual machines 4211, 4213, 4215, and 4217. In a third instance, the first entity may permit computer system 1010C to receive and execute virtual machines 4211, 4213, 4215, and 4217. In a fourth instance, a third entity, different from the first entity and the second entity, may be associated with virtual machine 4210, and the third entity may execute virtual machine 4210 via computer system 1010A. In another instance, a fourth entity, different from the first entity, the second entity, and the third entity, may be associated with virtual machine 4211, and the fourth entity may execute virtual machine 4211 via computer systems 1010A-1010C. In one or more embodiments, one or more of computer systems 1010A-1010C, among others, may receive one or more of virtual machines 4210-4217, among others, via network 2010.

Figure 7:
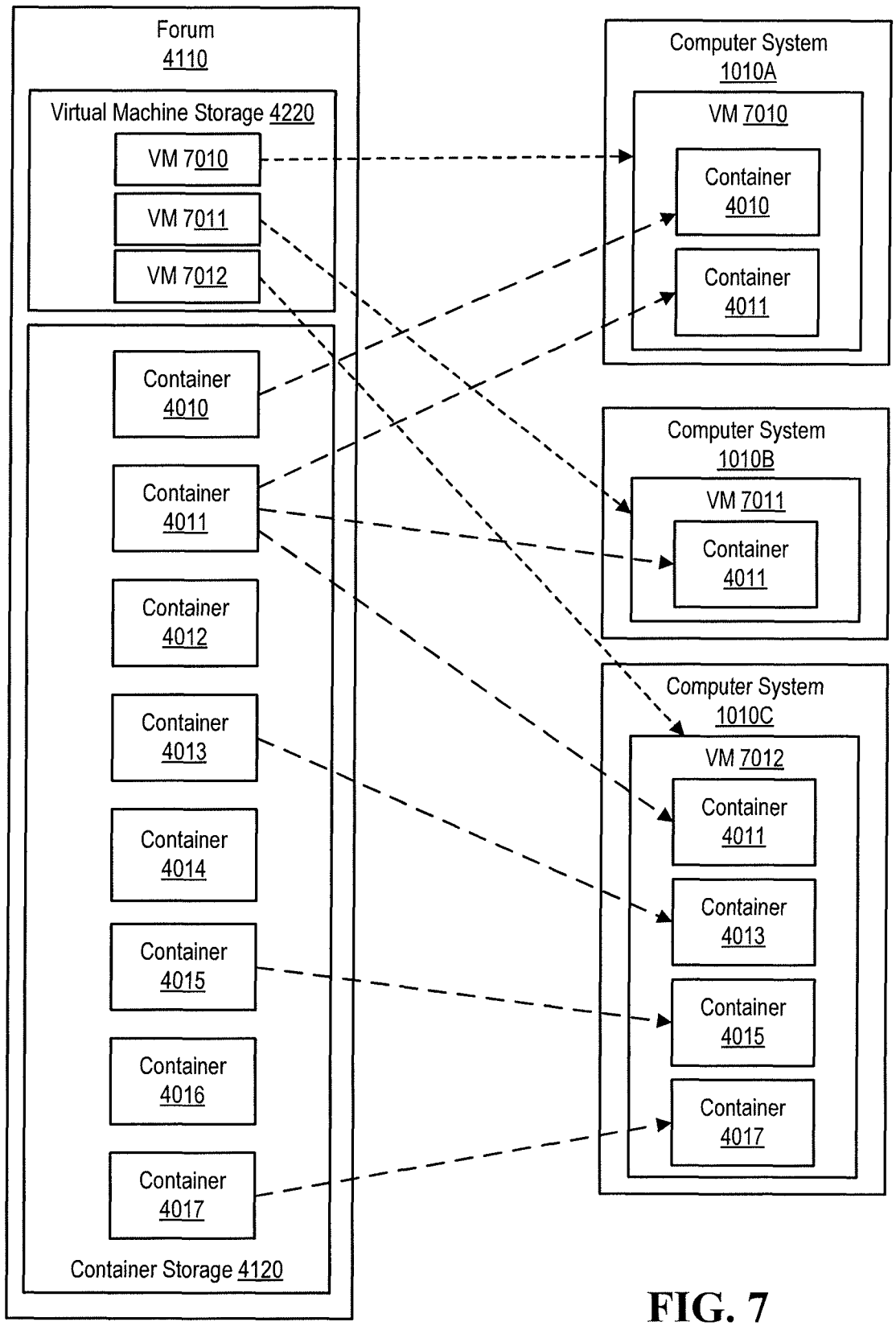
FIG. 7 provides a block diagram illustrating an example of distributing virtual machines and containers to computer systems, according to one or more embodiments.

Turning now to FIG. 7, a block diagram of distributing virtual machines and containers to computer systems is illustrated, according to one or more embodiments. As shown, forum 3110 may provide virtual machines 7010-7012 to computer systems 1010A-1010C, respectively. In one or more embodiments, forum 3110 may provide virtual machines 7010-7012 to computer systems 1010A-1010C, respectively, via a network. For example, the network may be or include network 2010.

In one or more embodiments, one or more of virtual machines 7010-7012 may provide a computing environment that one or more of containers 4010-4017 may execute. For example, one or more of virtual machines 7010-7012 may provide a computing environment where one or more of containers 4010-4017 may execute regardless of an underlying OS and/or regardless of underlying hardware of one or more of computer systems 1010A-1010C. For instance, one or more of virtual machines 7010-7012 may provide a consistent computing environment where one or more of containers 4010-4017 may execute. In one or more embodiments, one or more of virtual machines 7010-7012 may be utilized with one or more respective hypervisors. In one example, forum 3110 may provide the one or more respective hypervisors to respective one or more of computer systems 1010A-1010C. In another example, respective one or more of computer systems 1010A-1010C may include the one or more respective hypervisors. In one instance, respective one or more of computer systems 1010A-1010C may include the one or more respective hypervisors before respective virtual machines 7010-7012 are received. In another instance, respective one or more of computer systems 1010A-1010C may include the one or more respective virtual machines 7010-7012 before one or more of containers 4010-4017 are received.

As illustrated, forum 3110 may provide containers 4010 and 4011 to virtual machine 7010. In one or more embodiments, forum 3110 may provide containers 4010 and 4011 to virtual machine 7010 via network. For example, the network may be or include network 2010. As illustrated, forum 3110 may provide container 4011 to virtual machine 7011. In one or more embodiments, forum 3110 may provide container 4011 to virtual machine 7011 via a network. For example, the network may be or include network 2010. As shown, forum 3110 may provide containers 4011, 4013, 4015, and 4017 to virtual machine 7012. In one or more embodiments, forum 3110 may provide containers 4011, 4013, 4015, and 4017 to virtual machine 7012 via a network. For example, the network may be or include network 2010.

In one or more embodiments, Kubernetes may be utilized in providing one or more of containers 4010-4017 to one or more of virtual machines 7010-7012. In one example, Kubernetes may include a system that may automate deployment of one or more of containers 4010-4017 to one or more of virtual machines 7010-7012. In another example, Kubernetes may provide and/or permit scaling and/or management of containerized applications. For instance, Kubernetes may provide and/or permit scaling and/or management of one or more of containers 4010-4017 with one or more of virtual machines 7010-7012.

In one or more embodiments, one or more of computer systems 1010A-1010C, among others, may be included in one or more computing resources that are offered for compensation and/or trade. For example, one or more entities may own and/or control one or more of computer systems 1010A-1010C, among others. In one instance, a first entity may permit computer system 1010A to receive and execute containers 4010 and 4011, via virtual machine 7010, and may permit computer system 1010B to receive and execute container 4011, via virtual machine 7011. In a second instance, a second entity, different from the first entity, may permit computer system 1010C to receive and execute containers 4011, 4013, 4015, and 4017, via virtual machine 7012. In a third instance, the first entity may permit computer system 1010C to receive and execute containers 4011, 4013, 4015, and 4017, via virtual machine 7012. In a fourth instance, a third entity, different from the first entity and the second entity, may be associated with container 4010, and the third entity may execute container 4010 via computer system 1010A, via virtual machine 7010. In another instance, a fourth entity, different from the first entity, the second entity, and the third entity, may be associated with container 4011, and the fourth entity may execute container 4011 via computer systems 1010A-1010C, via respective virtual machines 7010-7012. In one or more embodiments, one or more of virtual machines 7010-7012, among others, may receive one or more of containers 4010-4017, among others, via network 2010.

In one or more embodiments, execution of two or more instructions executed by a processor may be performed concurrently. In one example, two or more of containers 4010-4017 may be executed concurrently. For instance, a portion of a first container of containers 4010-4017 and a portion of a second container, different from the first container, of containers 4010-4017 may be executed concurrently. In another example, two or more of virtual machines 4200-4217 may be executed concurrently. For instance, a portion of a first virtual machine of virtual machines 4200-4217 and a portion of a second virtual machine, different from the first virtual machine, of virtual machines 4200-4217 may be executed concurrently. In one or more embodiments, concurrently may mean simultaneously. In one or more embodiments, concurrently may mean apparently simultaneously according to some metric. In one or more embodiments, concurrently may mean that execution of a portion of a first container of containers 4010-4017 and execution of a portion of a second container, different from the first container, of containers 4010-4017 appear to be simultaneous to a human. In one or more embodiments, concurrently may mean that execution of a portion of a first virtual machine of virtual machines 4200-4217 and execution of a portion of a second virtual machine, different from the first virtual machine, of virtual machines 4200-4217 appear to be simultaneous to a human.

Figure 8:
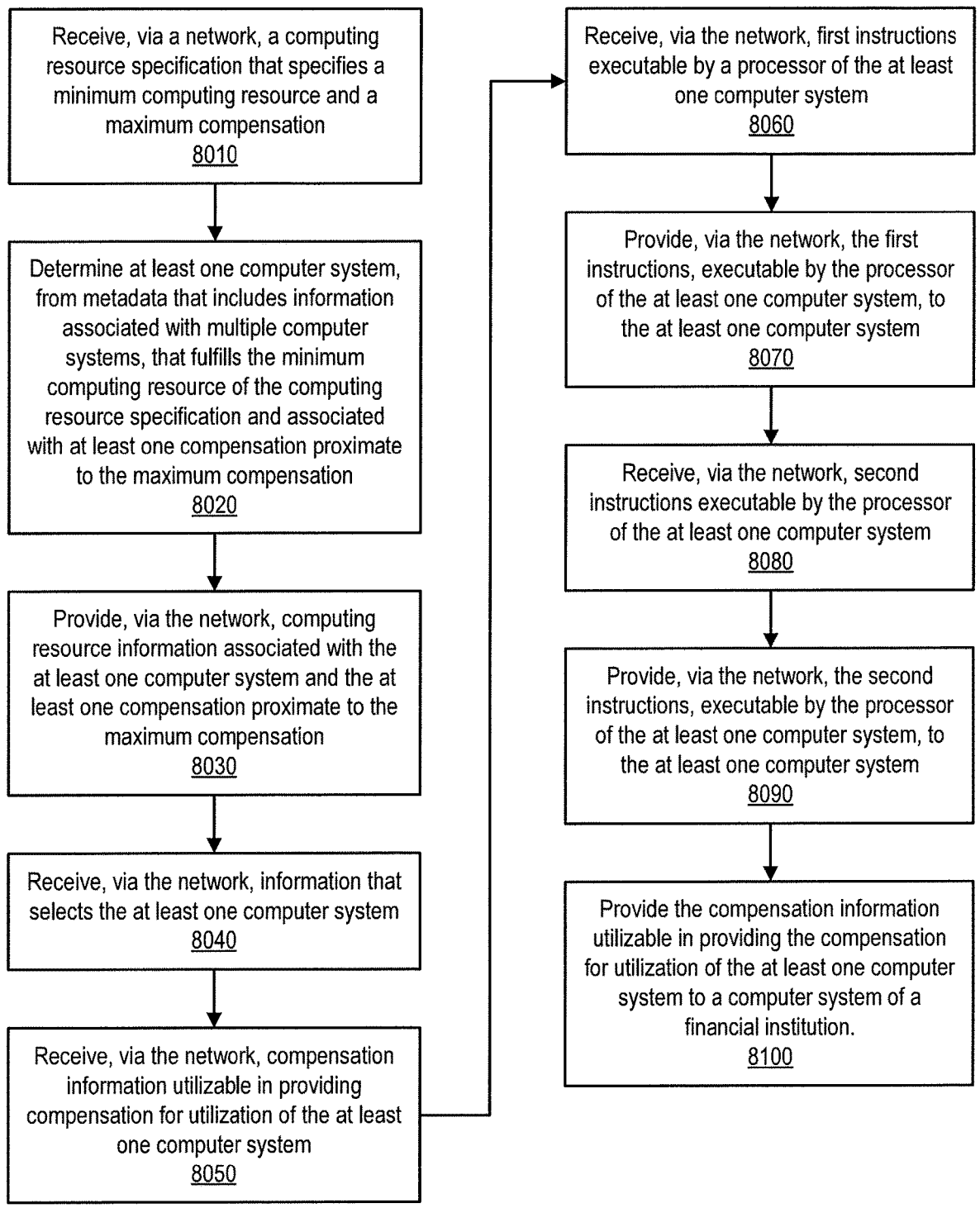
FIG. 8 illustrates an example of a method of providing processor instructions to at least one computer device, according to one or more embodiments.

Turning now to FIG. 8, a method of providing processor instructions to at least one computer device is illustrated, according to one or more embodiments. At 8010, a computing resource specification that specifies a minimum computing resource and a preferred compensation may be received via a network. For example, forum 3110 may receive the computing resource specification via network 2010. For instance, forum 3110 may include one or more of computer systems 1010A-1010H that are communicatively coupled to network 2010. In one or more embodiments, the minimum computing resource may include a minimum rate of processing instructions, an operating system identification, an operating system version, a minimum storage size (e.g., a size of volatile storage and/or a size of non-volatile storage), a minimum data communication rate, a minimum data communication latency, a minimum data communication throughput, a geographical location, a network location, a minimum cache size, and/or other computing resource.

At 8020, at least one computer system may be determined, from metadata that includes information associated with multiple computer systems, that fulfills the minimum computing resources of the computing resource specification and associated with at least one compensation proximate to the preferred compensation. For example, forum 3110 may determine at least one computer system, from metadata that includes information associated with multiple computer systems, that fulfills the minimum computing resources of the computing resource specification and associated with at least one compensation proximate to the preferred compensation.

In one or more embodiments, determining at least one computer system, from metadata that includes information associated with multiple computer systems, that fulfills the minimum computing resources of the computing resource specification and associated with at least one compensation proximate to the preferred compensation may include searching metadata 3120 and compensation information 3220 to determine at least one computer system that fulfills the minimum computing resources of the computing resource specification and associated with at least one compensation proximate to the preferred compensation. For example, forum 3110 may determine one or more computer systems that fulfill the minimum computing resources of the computing resource specification and associated with one or more compensations within a range of compensation (e.g., proximate to the preferred compensation) below and/or above the preferred compensation.

At 8030, computing resource information associated with the at least one computer system and the at least one compensation proximate to the preferred compensation may be provided via the network. For example, forum 3110 may provide, via network 2010, the computing resource information associated with the at least one computer system and the at least one compensation proximate to the preferred compensation. For instance, forum 3110 may provide, via network 2010, the computing resource information to a computer system (e.g., a computer system of computer systems 1010A-1010H) from which the computing resource specification was received. In one or more embodiments, the computing resource information associated with the at least one computer system and the at least one compensation proximate to the preferred compensation may be included in a web page. For example, forum 3110 may provide the web page to a computer system (e.g., a computer system of computer systems 1010A-1010H) via network 2010.

At 8040, information that selects the at least one computer system may be received via the network. For example, forum 3110 may receive, via network 2010, information that selects the at least one computer system. For instance, the information that selects the at least one computer system may select one or more of computer systems 1010A-1010H. In one or more embodiments, information that selects the at least one computer system may be received via a web server. For example, forum 3110 may include the web server.

At 8050, compensation information utilizable in providing compensation for utilization of the at least one computer system may be received via the network. For example, forum 3110 may receive, via network 2010, compensation information utilizable in providing compensation for utilization of the at least one computer system. In one example, the compensation information utilizable in providing compensation for utilization of the at least one computer system may include payment information. For instance, the payment information may include one or more account numbers that are utilizable in transferring one or more payments and/or one or more funds from a first account to a second account. In another example, the compensation information utilizable in providing compensation for utilization of the at least one computer system may include trading information. For instance, the trading information may include information associated with one or more of a service, a time period, and a physical object, among others, for utilization of a single computer system or multiple computer systems.

At 8060, first instructions executable by a processor of the at least one computer system may be received via the network. For example, forum 3110 may receive, via network 2010, first instructions executable by a processor of the at least one computer system. In one instance, the first instructions may include one or more of containers 4010-4017 and/or one or more of virtual machines 4200-4217, among others. In another instance, one or more of containers 4010-4017 and/or one or more of virtual machines 4200-4217 may include the first instructions.

At 8070, the first instructions, executable by the processor of the at least one computer system, may be provided, via the network, to the at least one computer system. For example, forum 3110 may provide, via network 2010, the first instructions, executable by the processor of the at least one computer system, to the at least one computer system. In one or more embodiments, after the first instructions are provided to the at least one computer system, the first instructions may be immutable. For example, the first instructions may be immutable while the first instructions are stored by the at least one computer system.

At 8080, second instructions executable by the processor of the at least one computer system may be received via the network. For example, forum 3110 may receive, via network 2010, second instructions executable by the processor of the at least one computer system. In one instance, the second instructions may include one or more of containers 4010-4017 and/or one or more of virtual machines 4200-4217, among others. In another instance, one or more of containers 4010-4017 and/or one or more of virtual machines 4200-4217 may include the second instructions.

In one or more embodiments, utilizing different containers and/or different virtual machines may provide a level of isolation between and/or among two or more different containers and/or different virtual machines. In one example, an isolation and/or a separation of processes (e.g., programs, applications, services, etc.) between and/or among two or more different containers and/or different virtual machines may be implemented via utilizing different containers and/or different virtual machines. In another example, an isolation and/or a separation of file systems between and/or among two or more different containers and/or different virtual machines may be implemented via utilizing different containers and/or different virtual machines. For instance, reads from and/or writes to identically named portions of two different file systems of two different containers and/or two different virtual machines may be different and/or directed to different the two different file systems.

In one or more embodiments, a combination of containers may be utilized in isolating different services. For example, a first container may include a web server, and a second container may include a database server. For instance, the web server of the first container may provide one or more database queries to the database server of the second container, and the database server of the second container may provide one or more results to the web server of the first container.

At 8090, the second instructions, executable by the processor of the at least one computer system, may be provided, via the network, to the at least one computer system. For example, forum 3110 may provide, via network 2010, the second instructions, executable by the processor of the at least one computer system, to the at least one computer system. In one or more embodiments, after the second instructions are provided to the at least one computer system, the second instructions may be immutable. For example, the second instructions may be immutable while the second instructions are stored by the at least one computer system.

At 8100, the compensation information utilizable in providing the compensation for utilization of the at least one computer system may be provided to a computer system of a financial institution. For example, forum 3110 may provide the compensation information utilizable in providing the compensation for utilization of the at least one computer system to a computer system of a financial institution. In one instance, the compensation information may include a bank account number. In another instance, the compensation information may include a credit card number.

Figure 9:
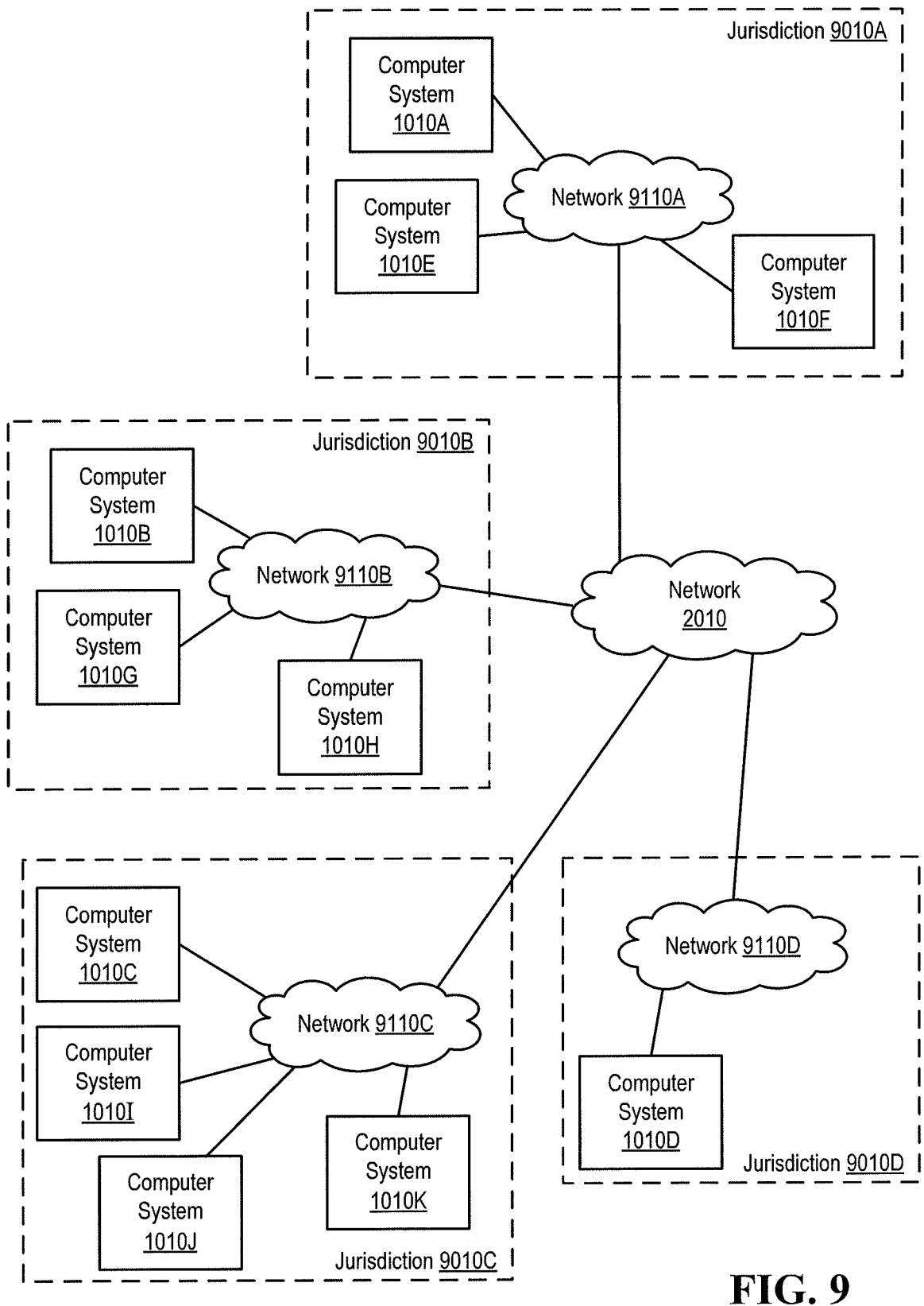
FIG. 9 illustrates example computer systems coupled to multiple networks in respective multiple jurisdictions, according to one or more embodiments.

Turning now to FIG. 9, example computer systems coupled to multiple networks in respective multiple jurisdictions are illustrated, according to one or more embodiments. As shown, computer systems 1010A, 1010E, and 1010F may be coupled to a network 9110A in a jurisdiction 9010A; computer systems 1010B, 1010G, and 1010H may be coupled to a network 9110B in a jurisdiction 9010B; computer systems 1010C and 1010I-1010K may be coupled to a network 9110C in a jurisdiction 9010C; and computer system 1010D may be coupled to a network 9110D in a jurisdiction 9010D. As illustrated, networks 9110A-9110D may be coupled to network 2010. In one or more embodiments, one or more of networks 9110A-9110D may include one or more structures and/or functionalities described with reference to network 2010.

In one or more embodiments, a jurisdiction may be subject to one or more privacy statutes and/or one or more privacy regulations. In one example, the one or more privacy statutes and/or one or more privacy regulations may apply to entities outside the jurisdiction that collect and/or process data of a resident and/or a citizen of the jurisdiction. In a second example, the one or more privacy statutes and/or the one or more privacy regulations may include a requirement that private information, of a resident and/or a citizen of the jurisdiction, is not transferred outside the jurisdiction. For instance, the requirement that private information of the citizen of the jurisdiction is not transferred outside the jurisdiction may stipulate that the private information of the citizen of the jurisdiction is not transferred outside the jurisdiction utilizing a public network, such as an Internet. In another example, the one or more privacy statutes and/or the one or more privacy regulations may include a requirement that a transaction that involves a citizen of the jurisdiction occurs within the jurisdiction. In one instance, the transaction may include a commercial transaction. In another instance, the transaction may include a banking transaction.

In one or more embodiments, private information may include personal data, and the personal data may include information relating to an individual. For example, the information relating to the individual may include information related to a private life, a professional life, and/or a public life of the individual. For instance, the information relating to the individual may include one or more of a home address, a photo, an email address, a name, a banking detail, medical information, a post on a social network, and an IP address of a computer system, among others.

In one or more embodiments, a jurisdiction may have and/or may be subject to one or more statutes and/or regulations that may not permit a computer system to directly provide, via a network, private information to a computer system outside the jurisdiction. In one example, computer system 1010E may not be permitted to directly provide, via a network, private information to computer system 1010D. In a second example, computer system 1010G may not be permitted to directly provide, via a network, private information to computer system 1010D. In another example, computer system 1010F may not be permitted to directly provide, via a network, private information to computer system 1010K.

In one or more embodiments, a first computer system within a jurisdiction may be permitted to provide private information to a second computer system within the jurisdiction, and the second computer system may provide the private information to a third computer system outside the jurisdiction. For example, one or more statutes and/or one or more regulations may permit the first computer system within the jurisdiction providing, via a network within the jurisdiction, the private information to the second computer system within the jurisdiction. In one instance, computer system 1010E may be permitted to directly provide, via network 9110A, private information to computer system 1010A, and computer system 1010A may provide the private information to computer system 1010D. In a second instance, computer system 1010G may be permitted to directly provide, via network 9110B, private information to computer system 1010B, and computer system 1010B may provide the private information to computer system 1010D. In another instance, computer system 1010F may be permitted to directly provide, via network 9110A, private information to computer system 1010A, and computer system 1010A may provide the private information to computer system 1010K.

Figure 10:
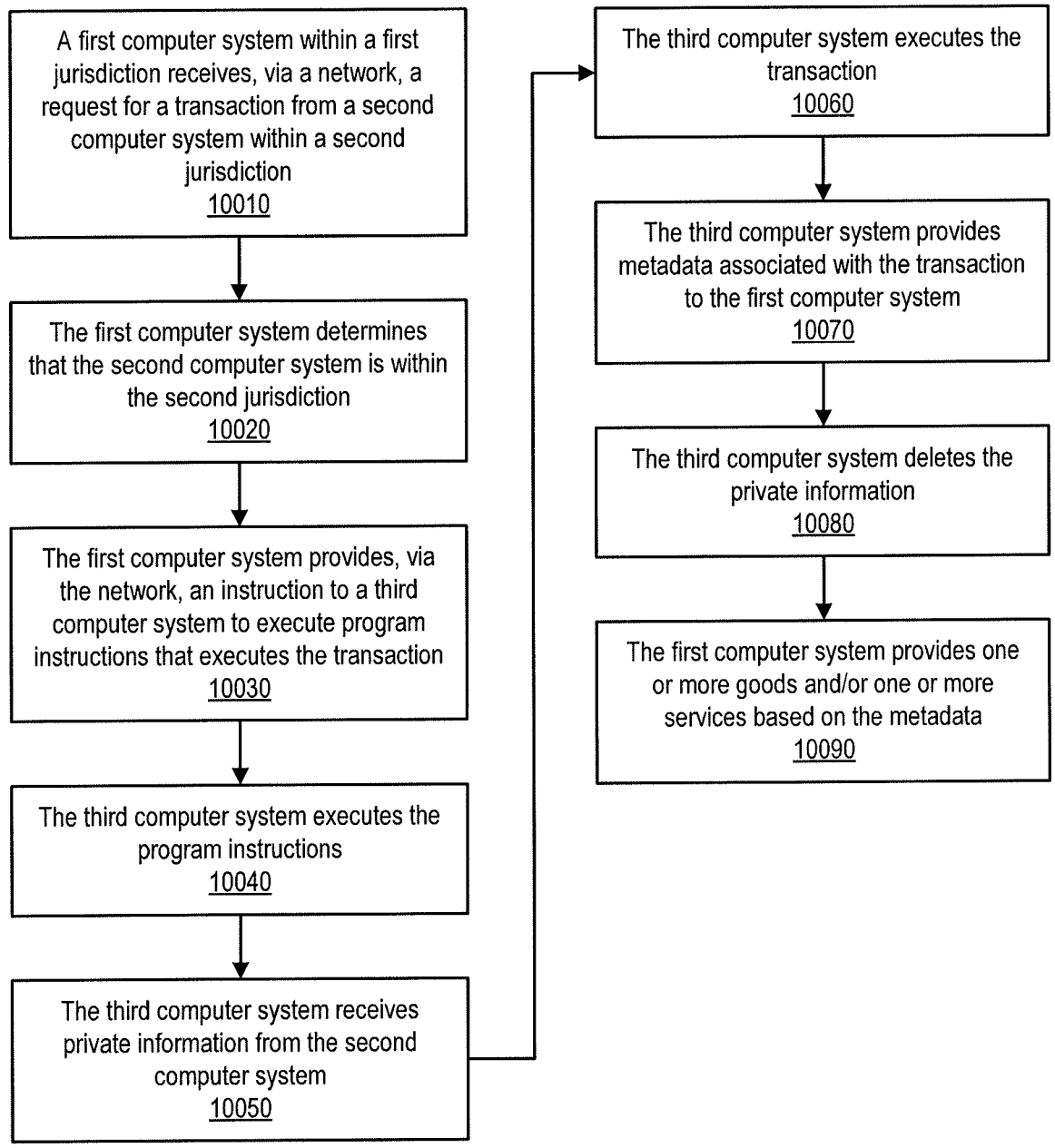
FIG. 10 illustrates an example of a method of conducting a transaction, according to one or more embodiments.

Turning now to FIG. 10, an example method of conducting a transaction is illustrated, according to one or more embodiments. At 10010, a first computer system within a first jurisdiction may receive, via a network, a request for a transaction from a second computer system within a second jurisdiction. In one example, the first computer system may be computer system 1010D within jurisdiction 9010D. For instance, computer system 1010D may be or may include one or more computer systems. In a second example, the second computer system may be computer system 1010E within jurisdiction 9010A, computer system 1010F within jurisdiction 9010A, computer system 1010G within jurisdiction 9010B, computer system 1010H within jurisdiction 9010B, computer system 1010I within jurisdiction 9010C, computer system 1010) within jurisdiction 9010C, or computer system 1010K within jurisdiction 9010C, among others. In another example, the first computer system may be computer system 1010K within jurisdiction 9010C, and the second computer system may be computer system 1010F within jurisdiction 9010A. In one or more embodiments, the transaction may include one or more of a banking transaction, a sales transaction, a financial transaction, a stock transaction, a property transaction, and a commercial transaction, among others.

At 10020, the first computer system may determine that the second computer system is within the second jurisdiction. In one example, determining that the second computer system is within the second jurisdiction may include receiving information from the second computer system that indicates that the second computer system is within the second jurisdiction. In one instance, the information from the second computer system may include an address of a user of the second computer system. In another instance, the information from the second computer system may include a network address (e.g., an IP address, a telephone number, a X.25 address, etc.), which may be utilizable in determining that the second computer system is within the second jurisdiction. In another example, determining that the second computer system is within the second jurisdiction may include utilizing account information. In one instance, the account information may indicate that the second computer system is within the second jurisdiction. In another instance, the account information may include a physical address that may be utilizable in determining that the second computer system is within the second jurisdiction.

At 10030, the first computer system may provide, via the network, an instruction to a third computer system, within the second jurisdiction, to execute program instructions that executes the transaction. In one example, the third computer system may be computer system 1010A within jurisdiction 9010A. In a second example, the third computer system may be computer system 1010B within jurisdiction 9010B. In another example, the third computer system may be computer system 1010C within jurisdiction 9010C.

In one or more embodiments, method element 10030 may be performed in response to a determination that the second jurisdiction is subject to one or more privacy statutes and/or one or more privacy regulations, via utilizing metadata that indicates that the second jurisdiction is subject to one or more privacy statutes and/or one or more privacy regulations. In one example, the second jurisdiction may be subject to one or more privacy statutes and/or one or more privacy regulations which may apply to entities outside the second jurisdiction that collect and/or process data of a resident and/or a citizen of the second jurisdiction. In a second example, the second jurisdiction may be subject to one or more privacy statutes and/or one or more privacy regulations, which may require that the computing resources comply with certain security measures. For instance, the computing resources utilized for a transaction may need to occur within the second jurisdiction. In one or more embodiments, further transaction requests may be received, and an entity that controls and/or owns the first computer system may establish a physical presence of one or more computer systems within the second jurisdiction. For example, the further transaction requests may reach a threshold within an amount of time transpiring.

In one or more embodiments, the first computer system may provide a branded look and feel to the third computer system. For example, an entity that owns and/or controls the first computer system may provide may provide a branded look and feel of the entity to the third computer system. In one or more embodiments, the program instructions that executes the transaction may include the branded look and feel of the entity. For example, the program instructions, that executes the transaction, may provide the branded look and feel of the entity to a user of the second computer system.

In one or more embodiments, the program instructions that executes the transaction may include or be included in a container. In one example, the program instructions that executes the transaction may include or be included in one or more of containers 4010 and 4011, which may execute within jurisdiction 9010A. In a second example, the program instructions that executes the transaction may include or be included in container 4011, which may execute within jurisdiction 9010B. In another example, the program instructions that executes the transaction may include or be included in one or more of containers 4011, 4013, 4015, and 4017, which may execute within jurisdiction 9010C.

In one or more embodiments, the program instructions that executes the transaction may include or be included in a virtual machine. In one example, the program instructions that executes the transaction may include or be included in one or more of virtual machines 4210 and 4211, which may execute within jurisdiction 9010A. In a second example, the program instructions that executes the transaction may include or be included in virtual machine 4211, which may execute within jurisdiction 9010B. In another example, the program instructions that executes the transaction may include or be included in one or more of virtual machines 4211, 4213, 4215, and 4217, which may execute within jurisdiction 9010C.

In one or more embodiments, the third computer system may receive one or more containers and/or one or more virtual machines from a forum or from the first computer system. In one example, the third computer system may receive the one or more containers and/or the one or more virtual machines from forum 3110 (e.g., illustrated in FIGS. 5-7). For instance, a fourth computer system may include forum 3110. In another example, the first computer system may be substituted for forum 3110 (e.g., illustrated in FIGS. 5-7) or may include forum 3110.

At 10040, the third computer system may execute the program instructions. In one example, the third computer system (e.g., computer system 1010A) may execute one or more of containers 4010 and 4011, which may execute within jurisdiction 9010A. In a second example, the third computer system (e.g., computer system 1010B) may execute container 4011, which may execute within jurisdiction 9010B. In a third example, the third computer system (e.g., computer system 1010C) may execute one or more of containers 4011, 4013, 4015, and 4017, which may execute within jurisdiction 9010C. In a fourth example, the third computer system (e.g., computer system 1010A) may execute one or more of virtual machines 4210 and 4211, which may execute within jurisdiction 9010A. In a fifth example, the third computer system (e.g., computer system 1010B) may execute virtual machine 4211, which may execute within jurisdiction 9010B. In another example, the third computer system (e.g., computer system 1010C) may execute one or more of virtual machines 4211, 4213, 4215, and 4217, which may execute within jurisdiction 9010C.

At 10050, the third computer system may receive private information from the second computer system. For example, the third computer system may receive private information from the second computer system via a network within the second jurisdiction. For instance, the private information may not leave, exit, and/or depart from the second jurisdiction. At 1060, the third computer system may execute the transaction. For example, the third computer system may utilize the private information in executing the transaction.

At 10070, the third computer system may provide metadata associated with the transaction to the first computer system. In one example, the metadata associated with the transaction may include an indication that the transaction was successful or unsuccessful. In another example, the metadata associated with the transaction may include one or more of a transaction identification (ID), a receipt, and time information (e.g., date, time of day, etc.), among others. At 10080, the third computer system may delete the private information. For example, deleting the private information may include destroying the private information. For instance, destroying the private information may include overwriting the private information with other information.

At 10090, the first computer system may provide one or more goods and/or one or more services based on the metadata. In one example, providing one or more goods and/or one or more services based on the metadata may include providing one or more instructions to ship one or more goods. For instance, one or more goods may have been purchased via the third computer system, and the first computer system may provide instructions to ship the purchased goods. In a second example, providing one or more goods and/or one or more services based on the metadata may include providing one or more streaming downloads to the second computer system. For instance, the first computer system may provide instructions to another computer system to permit providing one or more streaming downloads to one or more of the second computer system, a video display system, and a digital music player, among others. In another example, providing one or more goods and/or one or more services based on the metadata may include providing one or more instructions to transfer funds from a first account to a second account.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, methods, and/or processes described herein to produce the article of manufacture.

In one or more embodiments, the above-described systems, processes, and/or methods may be used to support e-commerce sites. In e-commerce, for example, the location of the transaction is often important. For instance, the European Union currently has significant restrictions about the type of private information that cannot leave the jurisdiction. Thus, computing resources handling such private information may be required to be located within the European Union. Because e-commerce sites can exist anywhere in the world, for instance, it may be difficult to comply with jurisdiction-specific requirements. For example, even if the e-commerce home site is located outside the jurisdiction, the information that a customer provides may need to comply with local requirements of the jurisdiction in which the customer is located.

To address these requirements, one or more embodiments of the present disclosure may permit and/or allow for spinning up to a microcloud within the jurisdiction in order to provide a local copy an e-commerce website of an e-commerce provider. For example, spinning up a microcloud may permit and/or allow the e-commerce provider to provide services to customers within a jurisdiction without requiring a separate hosting. For instance, the e-commerce provider may wait to obtain separate hosting within a particular jurisdiction until the e-commerce provider obtains and/or acquires a critical mass of customers in that jurisdiction. Thus, the e-commerce provider may not need to heavily invest in separate, jurisdiction-specific hosting that might otherwise be required to comply with all of the regulations and/or statutes of the jurisdiction only to discover that there may not be that many customers in that jurisdiction, currently or in the future.

One or more embodiments may make use of a reverse proxy configuration. For example, the e-commerce site may determine where a request originated and may utilize that information to leverage resources off of a public cloud that has access to a microcloud within the jurisdiction. For instance, the local microcloud may be spun up to support a local copy of the application requested by a customer in order to proxy the application locally. In one or more embodiments, the microcloud resources may be obtained using a cloud service broker that may permit and/or allow the e-commerce site to specify privacy requirements of third party computing resources that will be used to spin up the microcloud. After completing the transaction, for example, the microcloud may be configured to destroy private information received during the transaction. For instance, a minimal amount of information (that does not include private information) may be retained by the e-commerce site.

In one or more embodiments, the microcloud may include a container (e.g., thin container or thick container) and/or a virtual machine. Further, one or more embodiments may permit and/or allow for building containers in different jurisdictions and tailoring the containers to the specific needs of that jurisdiction. As one example, a jurisdiction-specific container may be configured to use a type of encryption required by that jurisdiction.

In certain embodiments, a customer may submit a request that would require spinning up computing resources within a jurisdiction that the party receiving the request, such as an e-commerce provider, does not have existing compute/ systems (or does not have sufficient computing resources to handle the request). In response to such situations, certain embodiments dynamically create and archive the necessary compute, storage, and other systems, for example, based on the meta data determined from the requested transactions and rules/regulations applicable to that jurisdiction. As additional transactions and requests originate from that jurisdiction, the party receiving the transactions and requests can decide to further dynamically expand and/or decide to establish permanent/dedicated infrastructure within that jurisdiction.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system, comprising:
   a hardware processor; and
   a memory medium that is coupled to the processor and that includes instructions executable by the processor;
   wherein the system is in a first jurisdiction and as the processor executes the instructions, the system:
   receives a request for a transaction that involves a citizen of a second jurisdiction from a second computer system in the second jurisdiction, wherein:
      the transaction comprises at least one of a sales transaction, a property transaction, and a commercial transaction, the transaction between a provider and a customer, wherein the system belongs to the provider and the citizen of the second jurisdiction is the customer;
      executing the transaction comprises receiving private information from the citizen of the second jurisdiction and using the private information;
      the request for the transaction does not comprise the private information; and
      the second jurisdiction is subject to a privacy law prohibiting a transfer of the private information to the first jurisdiction, the privacy law comprising at least one of a privacy statute and a privacy regulation;
   determines that the second computer system is in the second jurisdiction, wherein determining that the second computer system is in the second jurisdiction comprises receiving a network address of the second computer system;
   determines that the second jurisdiction is subject to the privacy law;
   in response to determining that the second jurisdiction is subject to the privacy law:
      selects, from a plurality of computer systems in the second jurisdiction, a third computer system, in the second jurisdiction, to execute the transaction;
      provides, to the third computer system, in the second jurisdiction, at least one of a container and a virtual machine that includes program instructions to execute the transaction;
      provides an instruction to the third computer system to execute the program instructions that executes the transaction, wherein:
         in response to executing the program instructions that execute the transaction, the third computer system receives the private information from the second computer system and uses the private information to complete the transaction; and
         the instructions included in the memory medium prevent the system from receiving the private information;
      receives, from the third computer system, metadata associated with the transaction, wherein:
         the metadata comprises an indication that the transaction was successful; and
         in response to providing the metadata to the system, the third computer system deletes the private information; and
      in response to receiving the metadata, provides at least one of one or more goods and one or more services to the citizen of the second jurisdiction, based on the metadata.

2. The system of claim 1, wherein the program instructions that executes the transaction include a branded look and feel.

3. The system of claim 1, wherein the privacy law includes a requirement that the transaction that involves the private information of a citizen of the second jurisdiction occurs within the second jurisdiction.

4. The system of claim 1, wherein when the system provides, to the third computer system, the at least one of the container and the virtual machine, the system provides the at least one of the container and the virtual machine to a fourth computer system that stores the at least one of the container and the virtual machine and provides the container to the third computer system.

5. The system of claim 1, wherein when the system receives the request for the transaction from the second computer system in the second jurisdiction, the system determines that the second jurisdiction is subject to the privacy law, based on metadata of the request.

6. The system of claim 1, wherein the second computer system and the third computer system communicate via a network within the second jurisdiction.

7. The system of claim 1, wherein the metadata includes a transaction identification, a receipt, and/or time information.

8. A method, comprising:
   a first computer system in a first jurisdiction receiving a request for a transaction that involves a citizen of a second jurisdiction from a second computer system in the second jurisdiction, wherein:
      the transaction comprises at least one of a sales transaction, a property transaction, and a commercial transaction, the transaction between a provider and a customer, wherein the system belongs to the provider and the citizen of the second jurisdiction is the customer;
      executing the transaction comprises receiving private information from the citizen of the second jurisdiction and using the private information;
      the request for the transaction does not comprise the private information; and
      the second jurisdiction is subject to a privacy law prohibiting a transfer of the private information to the first jurisdiction, the privacy law comprising at least one of a privacy statute and a privacy regulation;
   the first computer system determining that the second computer system is in the second jurisdiction, wherein determining that the second computer system is in the second jurisdiction comprises receiving a network address of the second computer system;
the first computer system determining that the second jurisdiction is subject to the privacy law;
in response to determining that the second jurisdiction is subject to the privacy law:
the first computer system selecting, from a plurality of computer systems in the second jurisdiction, a third computer system, in the second jurisdiction, to execute the transaction;
the first computer system providing, to the third computer system, in the second jurisdiction, at least one of a container and a virtual machine that includes program instructions to execute the transaction;
the first computer system providing an instruction to the third computer system to execute the program instructions that executes the transaction, wherein:
in response to executing the program instructions that execute the transaction, the third computer system receives the private information from the second computer system and uses the private information to complete the transaction; and
the first computer system is prevented from receiving the private information;
the first computer system receiving, from the third computer system, metadata associated with the transaction, wherein:
the metadata comprises an indication that the transaction was successful; and
in response to providing the metadata to the first computer system, the third computer system deletes the private information; and
in response to receiving the metadata, the first computer system providing at least one of one or more goods and one or more services to the citizen of the second jurisdiction, based on the metadata.

9. The method of claim 8, wherein the program instructions that executes the transaction include a branded look and feel.

10. The method of claim 8, wherein the privacy law includes a requirement that the transaction that involves the private information of a citizen of the second jurisdiction occurs within the second jurisdiction.

11. The method of claim 8, wherein the first computer system providing, to the third computer system, the at least one of the container and the virtual machine includes the first computer system providing the at least one of the container and the virtual machine to a fourth computer system that stores the at least one of the container and the virtual machine and provides the container to the third computer system.

12. The method of claim 8, wherein the first computer system receiving the request for the transaction from the second computer system in the second jurisdiction comprises determining that the second jurisdiction is subject to the privacy law, based on metadata of the request.

13. The method of claim 8, wherein the second computer system and the third computer system communicate via a network within the second jurisdiction.

14. The method of claim 8, wherein the metadata includes a transaction identification, a receipt, and/or time information.

15. A non-transitory computer-readable memory medium that stores instructions executable by a processor of a system in a first jurisdiction, wherein when the processor executes the instructions, the system:

receives a request for a transaction that involves a citizen of a second jurisdiction from a second computer system in the second jurisdiction, wherein:
the transaction comprises at least one of a sales transaction, a property transaction, and a commercial transaction, the transaction between a provider and a customer, wherein the system belongs to the provider and the citizen of the second jurisdiction is the customer;
executing the transaction comprises receiving private information from the citizen of the second jurisdiction and using the private information;
the request for the transaction does not comprise the private information; and
the second jurisdiction is subject to a privacy law prohibiting a transfer of the private information to the first jurisdiction, the privacy law comprising at least one of a privacy statute and a privacy regulation;
determines that the second computer system is in the second jurisdiction, wherein determining that the second computer system is in the second jurisdiction comprises receiving a network address of the second computer system;
determines that the second jurisdiction is subject to the privacy law;
in response to determining that the second jurisdiction is subject to the privacy law:
selects, from a plurality of computer systems in the second jurisdiction, a third computer system, in the second jurisdiction, to execute the transaction;
provides, to the third computer system, in the second jurisdiction, at least one of a container and a virtual machine that includes program instructions to execute the transaction;
provides an instruction to the third computer system to execute the program instructions that executes the transaction, wherein:
in response to executing the program instructions that execute the transaction, the third computer system receives the private information from the second computer system and uses the private information to complete the transaction; and
the instructions stored by the non-transitory computer-readable memory medium prevent the system from receiving the private information;
receives, from the third computer system, metadata associated with the transaction, wherein:
the metadata comprises an indication that the transaction was successful; and
in response to providing the metadata to the system, the third computer system deletes the private information; and
in response to receiving the metadata, provides at least one of one or more goods and one or more services to the citizen of the second jurisdiction, based on the metadata.

16. The non-transitory computer-readable memory medium of claim 15, wherein the program instructions that executes the transaction include a branded look and feel.

17. The non-transitory computer-readable memory medium of claim 15, wherein the privacy law includes a requirement that the transaction that involves the private information of a citizen of the second jurisdiction occurs within the second jurisdiction.

18. The non-transitory computer-readable memory medium of claim 15, wherein when the system provides, to the third computer system, the at least one of the container and the virtual machine, the system provides the at least one of the container and the virtual machine to a fourth computer system that stores the at least one of the container and the virtual machine and provides the container to the third computer system.

19. The non-transitory computer-readable memory medium of claim 15, wherein the second computer system and the third computer system communicate via a network within the second jurisdiction.

20. The non-transitory computer-readable memory medium of claim 15, wherein the metadata includes a transaction identification, a receipt, and/or time information.

* * * * *